United States Patent [19]

de Groot

[11] Patent Number: 5,404,221
[45] Date of Patent: Apr. 4, 1995

[54] EXTENDED-RANGE TWO-COLOR INTERFEROMETER

[75] Inventor: Peter J. de Groot, Middletown, Conn.

[73] Assignee: Zygo Corporation, Middlefield, Conn.

[21] Appl. No.: 21,754

[22] Filed: Feb. 24, 1993

[51] Int. Cl.$^6$ .......................... G01B 9/02; G01B 11/02
[52] U.S. Cl. .................................... 356/349; 356/345; 356/358
[58] Field of Search .................. 356/345, 349, 358

[56] References Cited

U.S. PATENT DOCUMENTS

| | | | |
|---|---|---|---|
| 3,171,881 | 3/1965 | Morokuma | 356/352 |
| 3,398,287 | 8/1968 | Krogstad et al. | 356/349 |
| 3,523,735 | 8/1970 | Taylor | 356/349 |
| 3,572,935 | 3/1971 | Howell | 356/358 |
| 4,355,899 | 10/1982 | Nussmeier | 356/349 |
| 5,096,296 | 3/1992 | Lu | 356/349 |
| 5,164,789 | 11/1992 | Yoshitake et al. | 356/349 |
| 5,268,739 | 12/1993 | Martinelli et al. | 356/349 |
| 5,285,252 | 2/1994 | Vareille et al. | 356/349 |

OTHER PUBLICATIONS

Wyant, J. C., "Testing Aspherics Two-Wavelength Holography", *Applied Optics*, Sep. 1971 vol. 10, No. 9.
Fercher, A. F., Hu, H. Z. and Vry, U., "Rough Surface Interferometry With A Two-Wavelength Heterodyne Speckle Interferometer", *Applied Optics*, 15 Jul. 1985, vol. 24, No. 14.
Cheng, Yeou-Yen and Wyant, James C., "Two-Wavelength Phase Shifting Interferometry", *Applied Optics*, 15 Dec. 1984, vol. 23, No. 24.
Tilford, Charles R., "Analytical Procedure For Determining Lengths From Fractional Fringes", *Applied Optics*, Jul. 1977, vol. 16, No. 7.
Massie, N. A. (Bert) and Caulfield, H. John "Absolute Distance Interferometry", *Interferometric Metrology*, SPIE vol. 816, 1987.
Haines, K. and Hildebrand, B. P., "Contour Generation By Wavefront Reconstruction", *Physics Letters*, 15, Sep. 1965, vol. 19, No. 1.
Hariharan, P., Oreb B. F., Eiju, T., "Digital Phase-Shifting Interferometry: A Simple Error-Compensating Phase Calculation Algorithm", *Applied Optics*, 1 Jul. 1987, vol. 26, No. 13.
Born, M. and E. Wolf *Principles of Optics*, Pergamon Press, 1987.

*Primary Examiner*—Robert P. Limanek
*Assistant Examiner*—David Ostrowski
*Attorney, Agent, or Firm*—Cohen, Pontani, Lieberman, Pavane

[57] ABSTRACT

A method and apparatus for distance measurement includes an optical interferometer, a two-color source characterized by a synthetic wavelength, and processing means for acquiring and analyzing phase information. The synthetic wavelength, which corresponds to the spatial period of phase coincidence in two-color interferometry, is commonly used in metrology to increase the unambiguous distance-measurement range. The invention provides a greatly enhanced unambiguous measurement range, for a given synthetic wavelength, over the unambiguous range of prior-art techniques. This extended range is achieved by analysis of a phase couple formed by a combination of the synthetic and optical phases. This phase couple repeats at spatial intervals which may be very much larger than the synthetic wavelength. Detailed computational methods for illumination source selection and for data analysis are provided, and several specific embodiments of the invention are described.

15 Claims, 5 Drawing Sheets

EXTENDED-RANGE TWO-COLOR INTERFEROMETER

FIELD OF THE INVENTION

The present invention relates generally to precision optical metrology instrumentation for distance measurement and, more particularly, to increasing the unambiguous measurement range of two-color interferometers.

BACKGROUND OF THE INVENTION

A well-known problem in metrology involves the interferometric measurement of distances and of changes in distance for surfaces that may have discontinuities larger than the source wavelength. Calculation of a round-trip optical path difference L in interferometers is carried out on the basis of the measured phase $-\pi < \phi < \pi$ and the optical wavelength $\lambda$:

$$L = \left( n + \frac{\phi}{2\pi} \right) \lambda \quad \text{(Equation 1)}$$

Since the phase is determined from an inverse trigonometric function, the same measured value of $\phi$ will be repeated at path-length intervals $R_n$ equal to $$R_n = n\lambda \quad \text{(Equation 2)}$$

where n is an integer that cannot be determined from the phase measurement alone. In the absence of some other information relating to the optical path length, the interferometer can only make unambiguous single-point measurements over a range limited to the optical wavelength.

To increase the unambiguous range, a second wavelength $\lambda_2$ with an associated phase $\phi_2$ and integer fringe order $n_2$ may be introduced. Multiple-color interferometry has been used for over a century to facilitate the identification of fringe orders. Traditionally, the analysis proceeds by some variation of the method of excess fractions, also known as the method of exact fractions which, according to the text *Principles of Optics* by M. Born and E. Wolf (Pergamon Press, 1987), was first used in four-color interferometry by J. R. Benoit in 1898. The method of excess fractions consists of determining mutually consistent values for the integer fringe orders n and $n_2$, given the measured fractional fringe orders $\phi/2\pi$ and $\phi_2/2\pi$. In its simplest form, the computational procedure for this method can be reduced to calculating a large number of possible distances for the given fractional fringe orders, and then observing which values are in closest agreement.

It has become common practice in the art to make the data processing in two-color interferometry more rapid and intuitive by defining a synthetic wavelength $\Lambda$, defined by the spatial beat period for a two-color interference pattern. The corresponding synthetic phase is $$\Phi = \phi - \phi_2 \quad \text{(Equation 3)}$$

constrained by $-\pi < \Phi \leq \pi$. Using this concept and assuming a perfectly compensated interferometer, a distance $L'$ can be obtained from the relationship $$L' = \left( N + \frac{\Phi}{2\pi} \right) \Lambda \quad \text{(Equation 4)}$$

where N is the integer synthetic fringe order and the synthetic wavelength $\Lambda$ is defined by $$\Lambda = \frac{\lambda \cdot \lambda_2}{\lambda_2 - \lambda} \quad \text{(Equation 5)}$$

If $N=0$, then an estimate $n'$ of the optical wavelength fringe order can be made by substituting Eq. (4) into Eq. (1) and rearranging to obtain $$n' = \frac{1}{2\pi} \left( \frac{\Phi \Lambda}{\lambda} - \phi \right) \quad \text{(Equation 6)}$$

The final distance measurement is then $$L = \left( Int\{n'\} + \frac{\phi}{2\pi} \right) \lambda \quad \text{(Equation 7)}$$

where the function Int{} returns the nearest integer to its argument. The unambiguous measurement range has thus now been extended to the synthetic wavelength $\Lambda$, which may be very much larger than $\lambda$.

The use of synthetic wavelengths has been widely accepted in many different forms of interferometry. In the two-wavelength holographic method described by K. Haines and B. P. Hildebrand in *Contour Generation By Wavefront Reconstruction*, 19 Physics Letters 10–11 (1965), the synthetic wavelength corresponds to the contour intervals of constructive interference in the reconstructed holographic image. Similar techniques involving synthetic wavelengths have been described by J. C. Wyant in *Testing Aspherics Using Two-Wavelength Holography*, 10 Applied Optics 2113–18 (1971). A computational approach to the method of exact fractions based on synthetic wavelengths is described in an article by C. R. Tilford entitled *Analytical Procedure For Determining Lengths From Fractional Fringes*, 16 Applied Optics 1857–60 (1977). U.S. Pat. No. 4,355,899 of T. A. Nussmeier, entitled Interferometric Distance Measurement Method, discloses the general concept of using synthetic wavelength information to remove the phase ambiguities in interferometry. This principle has been applied to full-aperture phase-modulation interferometry by Y. Cheng and J. C. Wyant, as described in *Two-Wavelength Phase Shying Interferometry*, 23 Applied Optics 4539–43 (1984). Virtually all modern embodiments of multiple color interferometers employ an analysis based on synthetic wavelengths as is manifest, for example, from the review article *Absolute Distance Interferometry by* N. A. Massie and H. John Caulfield, 816 Proceedings of the Society of Photooptical Engineers 149–57 (1987).

The only limitation of the synthetic-wavelength method, apart from practical difficulties in construction of appropriate instrumentation, is that the same synthetic phase $\Phi$ will repeat itself at distances $$R_n = N\Lambda. \quad \text{(Equation 8)}$$

Thus, the unambiguous range interval for this method is defined by $|L| < \Lambda/2$. It is generally accepted in the art that the only way in which to extend this range is to either increase the synthetic wavelength $\Lambda$ or incorporate additional optical, electrical or mechanical means for removing the synthetic-wavelength phase ambiguity. This limitation, which is evident in the aforementioned articles and widely known to those skilled in the art, restricts the choice of source and detection methods available for the implementation of two-color interferometry. For example the two-color source, which may be formed by two different kinds of inexpensive lasers, light-emitting diodes or interference filters, can become more costly or difficult to implement if a significantly different wavelength separation is required in order to increase the synthetic wavelength. In addition, some interferometers use prisms, gratings or interference filters to separate the two colors before detection, and this separation is rendered more difficult when the two colors are selected as very close in wavelength to one another in order to generate a large synthetic wavelength. These problems apply to all interferometers employing two colors for the purpose of measuring distances unambiguously over ranges larger than an optical wavelength.

OBJECTS OF THE INVENTION

Accordingly, it is a principal object of the present invention to measure distances interferometrically, without phase ambiguity, over ranges exceeding the synthetic wavelength of the two-color source illumination of the interferometer.

It is a further object of the invention to provide a systematic approach to selecting appropriate optical wavelengths for the two source colors so as to achieve an extension of the unambiguous measurement range by a chosen multiple of the synthetic wavelength.

It is another object of the invention to provide an efficient and accurate interferometric computational method and apparatus for performing distance measurements over ranges exceeding the synthetic wavelength of the two-color source illumination of the interferometer.

SUMMARY OF THE INVENTION

In accordance with a method of the invention, and apparatus for accomplishing the same, a first step consists of illuminating a Michelson or equivalent amplitude-division interferometer with a two-color source. One leg of the instrument includes a target surface whose position L is to be determined. In a second step the achievable unambiguous range for the two-color source is calculated and expressed as a multiple $N_r$ of the wavelength $\Lambda$. The value of this multiplying factor $N_R$ is a characteristic of the two-color source and, if a particular multiplying factor is desired, the source can be selected or adjusted according to a procedure taught hereinbelow in the Detailed Description of the Preferred Embodiments. Phase-modulation interferometry or like phase-detection means is used to calculate the interferometric phases $\phi$ and $\phi_2$ corresponding to each of the two source colors in a third step. In a next step, a synthetic phase $\Phi$ is calculated, and is constrained to a range of $\pm\pi$. In a further step, a synthetic fringe order N, generally considered to be unknown in prior art methods of two-color interferometry, is determined by analysis of the phase couple $(\Phi\phi)$. The phase couple $(\Phi\phi)$, composed of the combination of the synthetic phase $\Phi$ and the optical phase $\phi$, repeats at intervals which may be very much larger than the synthetic wavelength $\Lambda$. The unambiguous distance measurement range can therefore be extended using knowledge of the spatial evolution of this phase couple for the particular source colors employed. In a final step, the synthetic wavelength is utilized to determine the integer fringe order n for the optical wavelength, thus resulting in a distance measurement L having interferometric accuracy. Since the method of the invention includes an express determination of the synthetic fringe order N, the useful unambiguous range $N_R\Lambda$ of the instrument can be larger than the synthetic wavelength.

The ability to unambiguously measure beyond the synthetic wavelength greatly increases the functionality of interferometric measuring tools—making it possible, even in applications requiring a comparatively large unambiguous range, to use sources whose composite colors are widely spaced in wavelength. Thus, a two-color source for the present invention may be formed by two different kinds of inexpensive quasi-monochromatic devices, which may be relatively inexpensive and easy to obtain with a wide wavelength separation, or by a single gas laser emitting light efficiently in widely-separated spectral regions corresponding to different transitions in the gain medium, or by some combination of sources that would otherwise be impractical by virtue of a small synthetic wavelength. Moreover, detection of source colors using prisms, gratings, dichromatic prisms, and the like is greatly facilitated by a large spectral separation. Still another advantage lies in the ability to use a single multiple-order optical filter to control the transmitted source wavelengths and improve the temporal coherence of a source formed by two broadband devices, such as light-emitting diodes, whose large spectral bandwidths would otherwise overlap were the diode colors too close in wavelength. These advantages are readily adapted to other instruments based on interference phenomena, including imaging systems capable of simultaneously acquiring phase information for a plurality of points arranged in a two-dimensional array, as is the case with various well-known apparatus for testing optical components, analyzing wavefronts, or topographical mapping of microscopic surfaces.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE PREFERRED EMBODIMENTS

The present invention is directed to a methodology for extending, in a two-color interferometric distance measuring procedure, the effective synthetic wavelength $\Lambda$(see Equation 5, infra) so as to correspondingly extend the unambiguous range of distance or topographical surface feature measurement. Extension of the unambiguous range enables, by way of example, the measurement of test specimen surface features or discontinuities larger than $\Lambda/2$. The inventive methodology by which the effective synthetic wavelength and, thereby, the unambiguous measurement range, are extended consists of a manner of operating on and utilizing the phase data interferometrically generated from each of the two source illumination colors; thus, the advantageous functionality of the invention may be realized utilizing substantially conventional metrology apparatus for generating the phase data. The invention further provides preferred apparatus for implementing the novel methodology herein disclosed.

In order to facilitate a clear and complete understanding of the underlying principles of the invention, it is first reiterated from the above-described Background of the Invention that the optical phase $\phi$ repeats at intervals of $R_n = n\lambda$, while the synthetic phase $\Phi(\Phi = \phi - \phi_2)$ repeats at intervals of $R_N = N\Lambda$. In conventional two-color interferometry—as is generally understood and has been described in numerous articles and patents including, by way of example, the publications mentioned hereinabove—there is a natural limit of $\pm\Lambda/2$ imposed on the attainable unambiguous range, which limitation is based on the repetition of the synthetic phase $\Phi$ at intervals equal to the synthetic wavelength $\Lambda$. In accordance with the instant invention, however, it is recognized that the phase couple ($\Phi\phi$)—composed of the combination of the optical phase $\phi$ and the synthetic phase $\Phi$—repeats at intervals for which $R_N = R_n$. These intervals may be very much larger than the synthetic wavelength $\Lambda$.

Proceeding mathematically, when the two repeat distances $R_N$ and $R_n$ are set equal to one another, it is found that $$\Lambda = \frac{n_R}{N_R} \lambda \qquad \text{(Equation 9)}$$

where $n_R$ and $N_R$ are the values of the respective integers n and N for which the couple ($\Phi\phi$) repeats itself. Normally, the coefficient $n_R/N_R$ will be some non-integer rational number, and the integers $n_R$ and $N_R$ may have to be very large to approximate that number. If $\Lambda = 10.1 \cdot \lambda$, for example, then $n_R = 101$ and $N_R = 10$. The repeat distance $N_R \cdot \Lambda$ for this particular example is, therefore, ten times the synthetic wavelength.

The underlying principle of the invention having been demonstrated by these discussions, preferred apparatus and methods for achieving an extended unambiguous range in accordance with the instant invention are now presented.

If the source wavelengths used in an interferometer are adjustable or are otherwise selectable over a small range, then the procedure summarized below can be employed to assure that the synthetic wavelength satisfies the requirements of the extended-range algorithm for a multiplier $N_R$:

Step 1: Choose a desired unambiguous range that is an integral multiple $N_R$ of the present synthetic wavelength $\Lambda$;

Step 2: Choose a value $n_R$ such that the ratio $n_R/N_R$ is approximately $\Lambda/\lambda$;

Step 3: Confirm that the chosen ratio of $n_R$ to $N_R$ does not satisfy the repeat condition for smaller values of $N_R$—i.e. confirm that the ratio $n_R/N_R$ cannot be expressed using integers $n_R$ and $N_R$ smaller than the integers chosen in the foregoing steps 1 and 2; and Step 4: Adjust $\Lambda$ until it conforms as closely as possible to Equation 9.

Once the two-color source has been characterized according to this procedure, the following method extends the unambiguous range by making full use of the spatial evolution of the phase couple ($\Phi\phi$). In deriving this method, it should first be recalled that Equation 6 provides an estimate n' of the optical-wavelength integer fringe order that is valid over a range of $\pm\Lambda/2$; both the synthetic and optical phases $\Phi$, 100 appear in this equation. Now if L is larger than $\Lambda$, fractional errors equal to N times the non-integer part of the ratio of $\Lambda$ to $\lambda$ will be introduced into Equation 6; these fractional errors are therefore an indication of the integer synthetic fringe order. From these observations, one may derive a formula that yields an estimate of N' which can be used to extend the unambiguous range, as follows:

$$N' = -\frac{n' - Int\{n'\}}{\frac{\Lambda}{\lambda} - Int\left\{\frac{\Lambda}{\lambda}\right\}} \qquad \text{(Equation 10)}$$

The resulting estimate of N' can then be used in the following Equation 11 to provide a corrected estimate n" of the optical fringe order valid over the extended range:

$$n'' = \frac{1}{2\pi}\left(\frac{\Phi\Lambda}{\lambda} - \phi\right) + \frac{\Lambda}{\lambda} Int\{N'\}. \qquad \text{(Equation 11)}$$

The final calculation of the distance L is carried out by utilizing the estimate n" to first obtain $$L'' = \left(Int\{n''\} + \frac{\phi}{2\pi}\right)\lambda \qquad \text{(Equation 12)}$$

and then, constraining the final answer to the extended range $\pm N_R \Lambda/2$, using the relationship $$L = L'' - N_R \Lambda \cdot Int\left(\frac{L''}{N_R \Lambda}\right). \quad \text{(Equation 13)}$$

The above-described inventive methodology for processing of the phase date is summarized below:

Step 1: Measure the optical phases $\phi$ and $\phi_2$, and calculate the difference $\Phi$;

Step 2: Use Equation 6 to obtain an initial estimate $n'$ of the optical fringe order; the fractional error in this estimate relates to the synthetic fringe order;

Step 3: Use Equation 10 and the calculated estimate $n'$ to estimate the synthetic fringe order $N'$;

Step 4: Use Equation 11 to obtain a corrected estimate $n''$ of the optical fringe order;

Step 5: Use Equation 12 to calculate an intermediate distance value $L''$.

Step 6: Use Equation 13 to constrain the final optical path length distance value $L$ to the range of $\pm N_R \Lambda / 2$.

Careful consideration of the details of this method indicates that the signal-to-noise ratio, the phase measurement precision, and the wavelength stability requirement for obtaining an extended range are proportionally more stringent for increasing values of the range multiplier $N_R$. However, these requirements are no more exacting and difficult to achieve than the requirements that must otherwise be met if the unambiguous range were conventionally extended by simply enlarging the synthetic wavelength. Thus, the present invention does not demand any greater precision in phase measurement or wavelength stabilization, for a given unambiguous range, than that which is required by prior art techniques.

In its broadest sense, therefore, the present invention is directed to a method for extending the unambiguous range of two-color interferometry to a distance $N_R \Lambda$ by consideration of the couple ($\Phi\phi$), and in this manner fully utilizing optical-wavelength phase information that is discarded in prior art synthetic-wavelength techniques. It will also be recognized, given the teachings of the present invention, that similarly advantageous results may in principle be achieved by equivalent algebraic manipulations, or by inspection of the couple ($\phi$, $\phi_2$); nevertheless, it should be pointed out that the particular methods described herein provide systematic, efficient and readily apprehensible computational techniques for determining the extended range and for calculating distances over this extended range and are, accordingly, currently preferred. Furthermore, these preferred computational techniques have been conveniently described using the intuitive concept of a synthetic wavelength $\Lambda$ and a range multiplier $N_R$.

Figure 1:
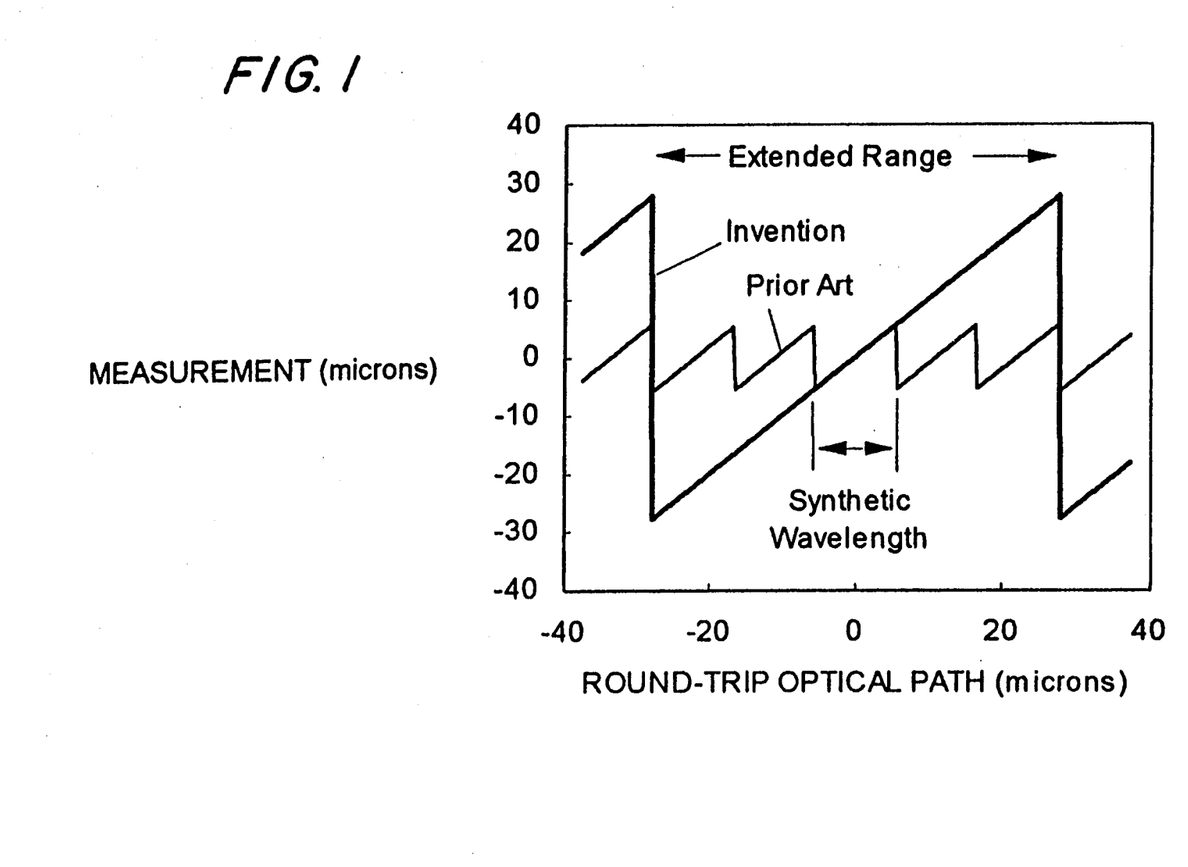
FIG. 1 is a graph depicting the results of a computer simulation in which the extended unambiguous range of the method and apparatus of the present invention (heavy line) and the restricted range of conventional synthetic-wavelength methods are compared.

A practical example of an extension of the unambiguous range of measurement through use of the methodology of the present invention is graphically illustrated in FIG. 1. For this example, a first optical wavelength $\lambda = 612.4$ nm and a second wavelength $\lambda_2 = 648.0$ nm were selected, yielding a synthetic wavelength $\Lambda = 11.146$ $\mu$m which corresponds to a ratio $n_R/N_R$ of 91/5. Utilizing a computer simulation, a plurality of modulo $2\pi$ phases $\phi$ and $\phi_2$ were generated for a range of round-trip optical path differences $L$. Proceeding from Equations 6, 10, 11 and 12, the original distances were recovered without ambiguity over a range of $5\Lambda = 56$ $\mu$m. For comparison, the results of the conventional synthetic-wavelength algorithm utilizing only Equations 6 and 7 are also depicted in FIG. 1; the conventional algorithm can only be used over a range of 11 $\mu$m.

The teachings provided herein can therefore be applied to any measurement system employing two source wavelengths to remove interferometric phase ambiguities. A specific apparatus for implementation of the inventive methodology will now, by way of example, be described.

Figure 2:
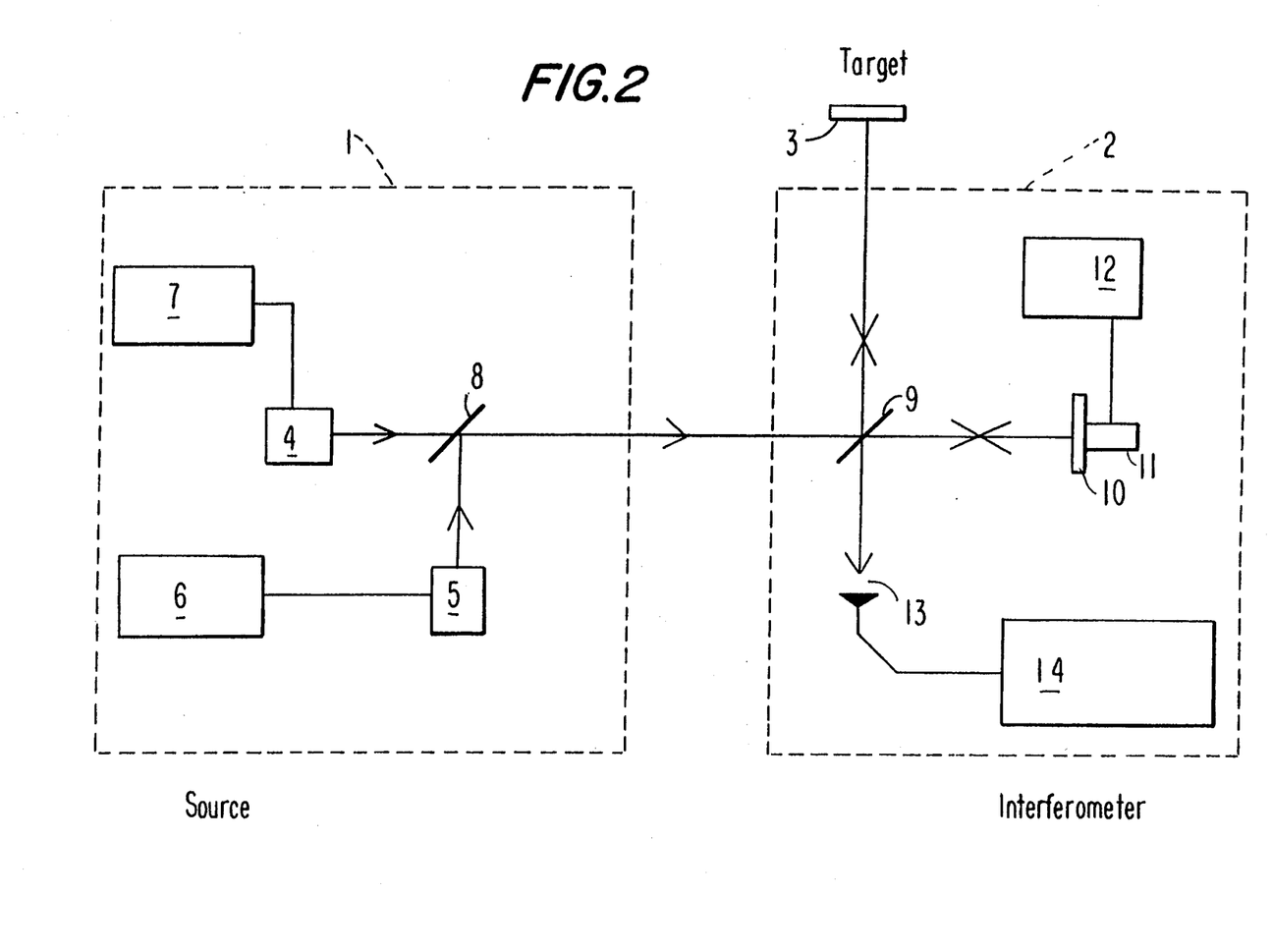
FIG. 2 is a block diagram representation of a first embodiment of the invention including a simple two-color source, an amplitude-division interferometer and an object surface whose position is to be determined.

Referring to FIG. 2, an interferometric measurement system with extended unambiguous range capability includes a two-color source 1 and an amplitude-division Michelson interferometer 2. The measurement system is operable to determine the position of a target 3 which, in the figure, is represented as one of the two mirrors of the interferometer.

The source 1 in the embodiment of FIG. 2 is itself comprised of a first individual source 4 and a second individual source 5, each of which may for example be light-emitting diodes, laser diodes, gas lasers, or like narrow band or quasi-monochromatic devices. The individual sources 4, 5 are controlled by respective electrical means 7, 6. The electrical means 6, 7 will typically include appropriate stabilization circuitry as may be required for selecting and/or maintaining the source wavelengths for a chosen extended range. Semiconductor sources such as light-emitting diodes and laser diodes, by way of example, may be conveniently controlled by adjusting the excitation current, which adjustment has the effect of varying the emission wavelength. Not shown in the figures are any associated wavelength monitoring devices or systems that may be appropriate or required for facilitating wavelength stabilization. The emissions from the individual sources 4, 5 are combined by a partially-reflective element 8 and are then transmitted to the interferometer 2.

The interferometer in FIG. 2 is comprised of a beam-splitting element 9 that transmits one portion of the beam to a reference mirror 10 and the other beam portion to the target 3. The reference mirror 10 is actuated by an electro-mechanical transducer 11, such as a piezoelectric crystal, and associated drive electronics 12 so as to effect precisely-controlled displacements of the mirror 10 on the order of one-eighth ($\frac{1}{8}$) of one optical wavelength. These small displacements are required for many of the common phase detection schemes known in the art such, for example, as that described by P. Hariharan, F. F. Oreb, and T. Eiju in *Digital Phase-Shifting Interferometry: A Simple Error-Compensating Phase Calculation Algorithm*, 26 Applied Optics 2504–06 (1987). The two beams reflected from the target 3 and reference mirror 10 are recombined and projected onto a detector 13 which generates an electrical signal proportional to the resultant beam intensity produced by the interference effect. This electrical signal is received and processed by electronic data acquisition and analysis means 14.

The measurement procedure is initiated by determining, first, an instantaneous interferometric phase $\phi$ for the individual source 4 and, then, the phase $\phi_2$ for the individual source 5. This may be accomplished by switching these sources alternately on and off so as to not confuse the two interference patterns. The distance calculation then proceeds in accordance with the methodology described hereinabove.

Although the general appearance and functionality of the apparatus depicted in FIG. 2 may at first glance appear to be known, it should be recognized that the manners in which the illumination source is characterized and the phase information is processed are entirely different from prior art apparatus and techniques. The inventive methodology permits and, indeed, may encourage the use of sources that would be adjudged as having insufficient unambiguous range when using conventional methods. For example, in the practice of the present invention the source 4 may be a Helium-Neon gas laser oscillating at 632.8 nm and the source 5 may be a tunable laser diode operating at 780 nm. Such a combination may in accordance with the invention prove useful in the modification of existing interferometers based on Helium-Neon lasers, as for the purpose of measuring discontinuous step heights on a target surface or the metrology of rough surfaces, or in the calculation of the radius of curvature of an optical component under test. The resulting synthetic wavelength of 3.35 $\mu$m is, however, too small for many applications if the unambiguous range is limited to this value, a limitation which would be present in the use of prior-art techniques. Since there exists a much wider choice of laser diodes in the near-infrared—including wavelength-stabilized and high-power devices—it is undesirable to substantially lower the diode wavelength for the sole purpose of extending the unambiguous range; rather, it would be far more advantageous under these circumstances to employ the teachings of the present invention without changing the sources already present in the apparatus.

Figure 3:
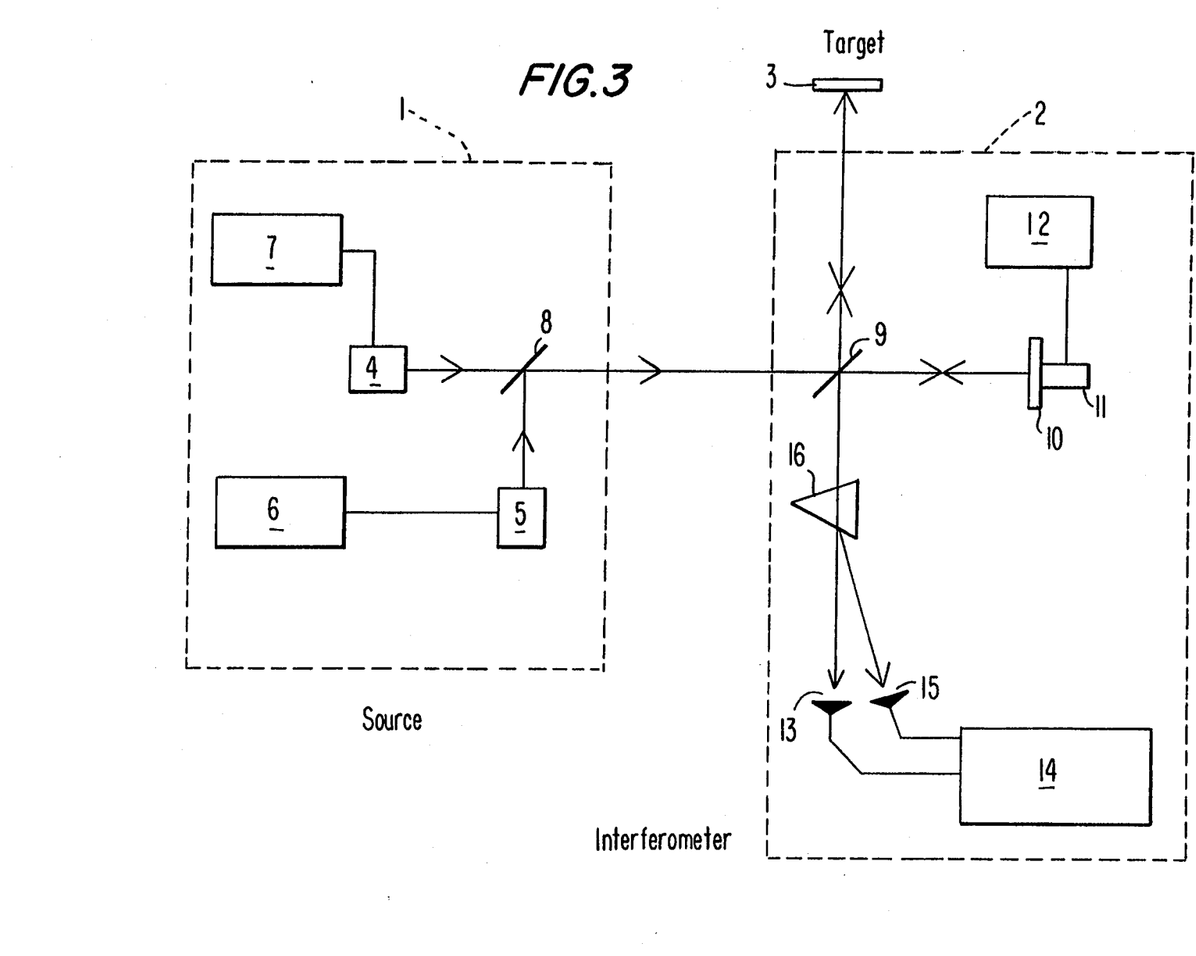
FIG. 3 is a block diagram representation of another embodiment of the invention in which a second detector and a dichromatic beam splitter element have been added to the embodiment of FIG. 1.

Further advantages readily attainable in accordance with the invention will be appreciated by reference to FIG. 3 which depicts an alternative apparatus embodiment. This second embodiment is substantially the same as that depicted in FIG. 2 but further includes a second detector 15 and a dichromatic beam splitter element 16, thus enabling simultaneous illumination of the interferometer by both source colors which are separated, before detection, by the dispersing prism 16. Such an arrangement is similar to that employed by A. F. Fercher, H. Z. Hu and U. Vry in *Rough Surface Interferometry With A Two-Wavelength Heterodyne Speckle Interferometer*, 24 Applied Optics 2181–88 (1985). As should of course be apparent, the complete and efficient separation of the two colors of source illumination is essential to the successful operation of these systems. Generally, this separation is more efficient and less costly to obtain where the source colors are widely separated in wavelength, a goal that is readily attainable with the present invention without sacrificing unambiguous range. Other methods of separating the illumination colors—as by spectral filtering, for example with interference filters, diffraction gratings or the like—similarly benefit from the methods herein taught in accordance with the invention.

Figure 4:
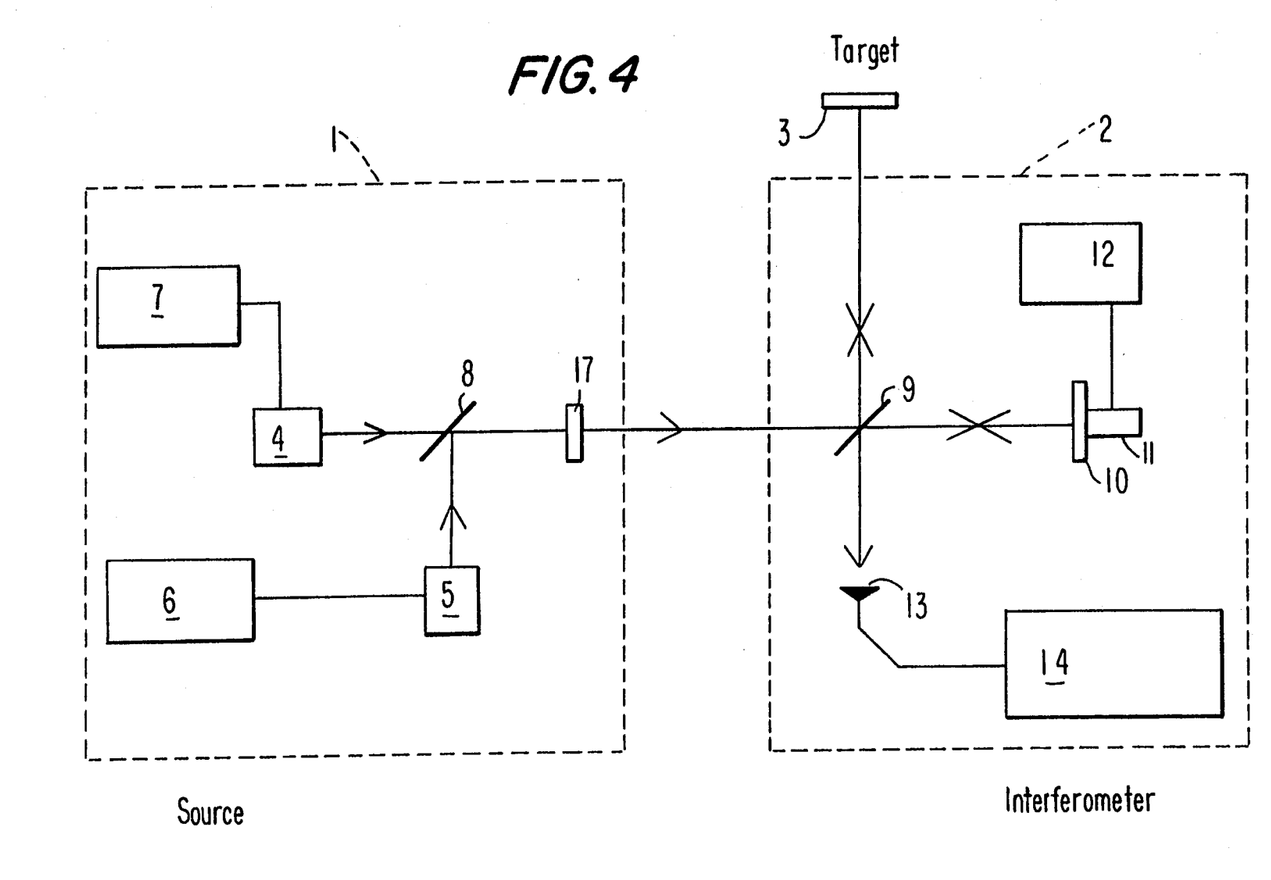
FIG. 4 is a block diagram representation of a still further embodiment of the invention in which a multiple-order interference filter has been added to the embodiment of FIG. 1 for controlling and modifying the spectral characteristics of the illumination source.
Figure 5:
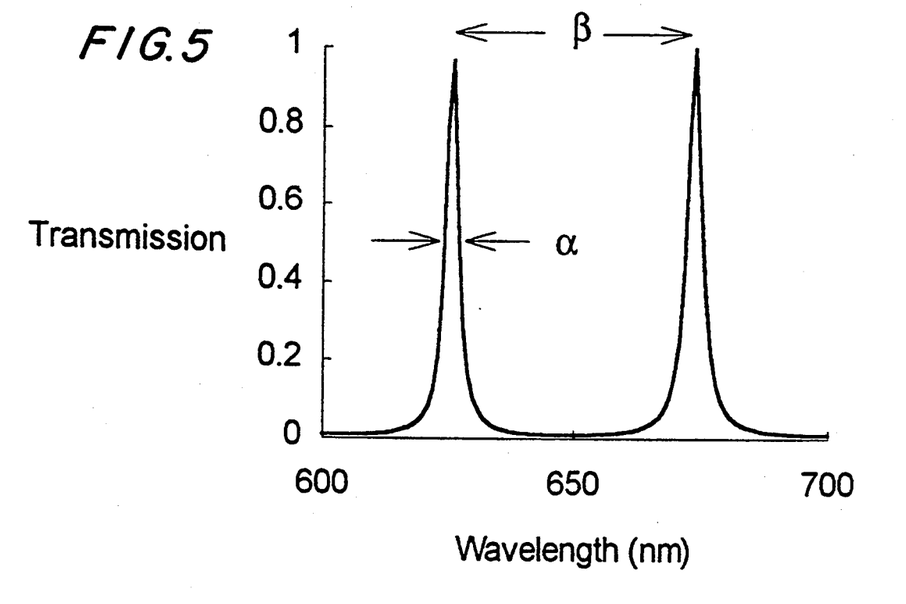
FIG. 5 is a graph depicting the transmission properties of the multiple-order transmission filter of the embodiment of FIG. 4.
Figure 6:
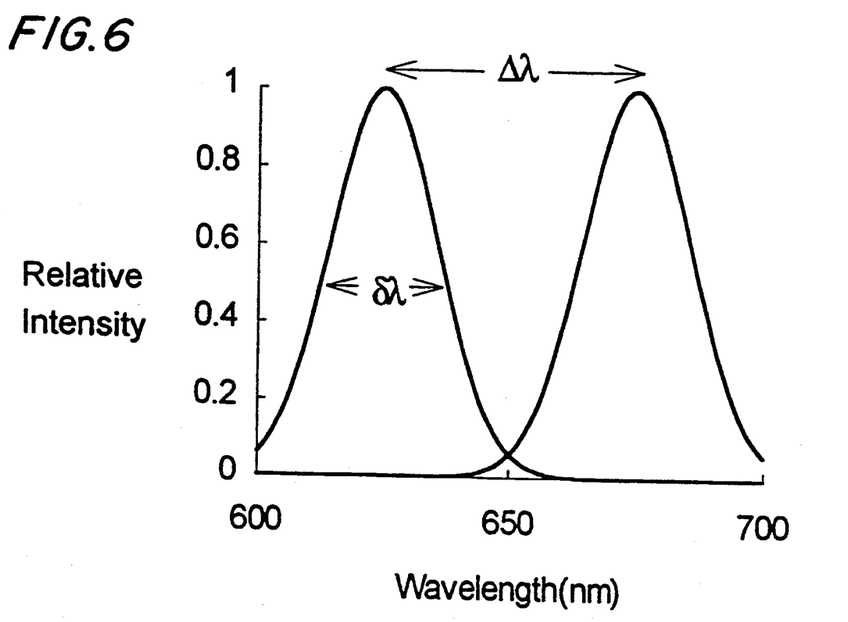
FIG. 6 is a graph depicting the superimposed spectra of two broadband sources.

FIG. 4 depicts a further embodiment of the invention in which a multiple-order filter element 17 has been added to the basic apparatus illustrated in FIG. 2. The filter 17 may for example be of the Fabry-Perot interference type, such as may be provided by a single or double layer of dielectric material on a suitable transparent substrate, or by a pair of partially reflective mirrors maintained in parallel relation and separated by a small air gap, thus forming what is commonly referred to as an air-gap etalon. The resulting transmission as a function of wavelength is in the form of a series of peaks of width $\alpha$ and separation $\beta$. Two of these transmission peaks are shown in FIG. 5, there illustrated for the case in which the filter 17 is implemented by an etalon having an air gap of 8.75 $\mu$m. The source 1 for this embodiment is formed by two light-emitting diodes, or similar broad-band devices, separated in wavelength by $\Delta\lambda$ and each having a spectral width $\delta\lambda$. An example of the superimposed output spectra for two devices emitting at 625 nm and 675 nm, respectively in the FIG. 4 apparatus is shown in FIG. 6. From FIG. 6 may be seen that the filter 17 is so designed that the two source colors overlap the peaks in the transmission spectrum shown in FIG. 5. Apart from the additional additional introduction thereto of the filter 17, the procedure for making measurements utilizing the apparatus of FIG. 4 is the same as that described hereinabove for the apparatus depicted in FIG. 2—that is, the individual sources are turned alternately on and off to obtain independent phase information for each of the two colors emitted by the source 1.

The filter 17 in FIG. 4 performs two functions. The first is to precisely define the transmitted wavelengths of the two-color source 1 so as to relax the wavelength stabilization requirements on the individual devices 4, 5, and the second is to reduce the effective linewidth of the individual colors from $\delta\lambda$ to $\alpha$, thus increasing the coherence length so that the interferometer may operate over a larger operational range with good fringe contrast. These two features constitute extremely useful improvements to conventional two-color interferometry. However, the filter 17 will properly function only if the separation $\beta$ of the transmission peaks of the two illumination sources or devices 4, 5 exceeds the spectral width $\delta\lambda$ by a sufficient margin to prevent the emissions of a single device from simultaneously overlapping both transmission peaks. This constraint imposes an effective limit on the achievable synthetic wavelength utilizing this FIG. 4 configuration. For example, common red light-emitting diodes have spectral linewidths of approximately 25 nm. Thus, the transmission peak separation must be at least 50 nm to prevent accidental overlap, corresponding to a synthetic wavelength of about 7 $\mu$m. The method of the present invention enlarges the unambiguous range without narrowing the spectral separation of the source colors, thereby preventing accidental overlap, in a way which is not possible with any prior art two-color technique.

The preferred method and apparatus embodiments herein illustrated and described disclose various aspects of the present invention in the context of a particular form of amplitudedivision interferometer. However, those skilled in the art will readily recognize and appreciate that the fundamental novel features of the invention may be readily applied to other instruments based on interference phenomena including, by way of example, imaging systems capable of simultaneously acquiring phase information for a plurality of points arranged in a two-dimensional array, as is the case with a variety of known apparatus for testing optical components, analyzing wavefronts, or topographical mapping of microscopic surface details. Also within the intended scope and contemplation of the invention are adaptations to fiber sensors and integrated optical devices employing multiple wavelengths to extend their range.

Thus, while there have been shown and described and pointed out fundamental novel features of the invention as applied to several preferred embodiments thereof, it will be understood that various omissions and substitutions and changes in the form and details of the methods and apparatus herein disclosed may be made by those skilled in the art without departing from the spirit of the invention. It is the intention, therefore, to be limited only as indicated by the scope of the claims appended hereto.

What is claimed is:

1. A method for extending an unambiguous range of interferometric measurement of an object illuminated by a source having a first color wavelength $\lambda$, a second color wavelength $\lambda_2$ and a synthetic wavelength $\Lambda = (\lambda \cdot \lambda_2)/(\lambda_2 - \lambda)$, to an unambiguous range greater than the synthetic wavelength $\Lambda$, comprising the steps of:
   (a) determining an instantaneous interferometric optical phase $\phi$ of the first source color, an instantaneous interferometric optical phase $\phi hd 2$ of the second source color, and a synthetic phase $\Phi$ defined by $\phi - \phi_2$; and
   (b) calculating the object measurement by analysis of a phase couple formed by a combination of said synthetic phase $\Phi$ and said first source color optical phase $\phi$.

2. A method for extending an unambiguous range of interferometric measurement of an object illuminated by a source having a first color wavelength $\lambda$, a second color wavelength $\lambda_2$ and a synthetic wavelength $\Lambda = (\lambda \cdot \lambda_2)/(\lambda_2 - \lambda)$, to an unambiguous range greater than the synthetic wavelength $\Lambda$, comprising the steps of:
   (a) calculating an unambiguous range multiplier integer $N_R$ consistent with the first color wavelength $\lambda$ and second color wavelength $\lambda_2$ for providing an unambiguous measurement range $N_R \Lambda$, wherein $N_R > 1$;
   (b) determining an instantaneous interferometric optical phase $\phi$ of the first source color, an instantaneous interferometric optical phase $\phi_2$ of the second source color, and a synthetic phase $\Phi$ defined by $\phi - \phi_2$;
   (c) estimating a synthetic fringe order $N' \leq N_R$ using the first source color optical phase $\phi$ and the synthetic phase $\Phi$ which together define a phase couple $(\Phi, \phi)$ that repeats at intervals of $N_R \Lambda$; and
   (d) calculating the object measurement using the first source color optical phase $\phi$, the first source color wavelength $\lambda$, the synthetic phase $\Phi$, and the synthetic fringe order $N'$ estimated in said step (c).

3. The method of claim 2, wherein said step (c) comprises:
   (i) obtaining an initial estimate $n'$ of an optical fringe order $n$ for the first color source wavelength $\lambda$ in accordance with:
   $$n' = \frac{1}{2\pi}\left(\frac{\Phi \Lambda}{\lambda} - \phi\right); \text{ and}$$
   (ii) obtaining an estimate $N'$ of the synthetic fringe order in accordance with:
   $$N' = -\frac{n' - Int\{n'\}}{\frac{\Lambda}{\lambda} - Int\left(\frac{\Lambda}{\lambda}\right)}.$$

4. The method of claim 2, wherein said step (d) comprises:
   (i) determining a corrected optical fringe order $n''$ for the first color source wavelength $\lambda$ using the synthetic fringe order $N'$ determined in said step (c); and
   (ii) calculating the object measurement using the optical fringe order $n''$ determined in said step (i).

5. The method of claim 4, wherein the object measurement is a distance L and said step (ii) comprises the steps of:
   (A) obtaining a corrected estimate $n''$ of the optical fringe order $n$ in accordance with:
   $$n'' = \frac{1}{2\pi}\left(\frac{\Phi \Lambda}{\lambda} - \phi\right) + \frac{\Lambda}{\lambda} Int\{N'\}; \text{ and}$$
   (B) calculating the distance L by the steps of:
      (1) calculating an intermediate distance value $L''$ in accordance with:
      $$L'' = \left(Int\{n''\} + \frac{\phi}{2\pi}\right)\lambda; \text{ and}$$
      (2) calculating the distance L in accordance with:
      $$L = L'' - N_R \Lambda \cdot Int\left(\frac{L''}{N_R \Lambda}\right).$$

6. The method of claim 5, wherein said step (a) comprises the steps of:
   (I) selecting an unambiguous range that is an integral multiple $N_R$ of the synthetic wavelength $\Lambda$;
   (II) choosing an integer $n_R$ such that a first ratio $n_R/N_R$ is approximately equal to a second ratio $\Lambda/\lambda$; and
   (III) adjusting at least one of the first and second color wavelengths $\lambda$, $\lambda_2$ to more closely approximate equality of the first ratio $n_R/N_R$ and the second ratio $\Lambda/\lambda$.

7. The method of claim 6, wherein said step (II) further comprises confirming that said first ratio $n_R/N_R$ cannot be represented by an equal value ratio $x/y$ having integers $y$ and $x$ that are smaller than said respective integers $N_R$ and $n_R$.

8. A method for extending an unambiguous range of interferometric measurement of an object illuminated by a source having a first color wavelength $\lambda$, a second color wavelength $\lambda_2$ and a synthetic wavelength $\Lambda = (\lambda \cdot \lambda_2)/(\lambda_2 - \lambda)$, to an unambiguous range greater than the synthetic wavelength $\Lambda$, comprising the steps of:
   (a) determining an instantaneous interferometric optical phase $\phi$ of the first source color, an instantaneous interferometric optical phase $\phi_2$ of the second source color, and a synthetic phase $\Phi$ defined by $\phi - \phi_2$;
   (b) calculating an unambiguous range multiplier integer $N_R$ for providing an unambiguous measurement range $N_R \cdot \Lambda$, wherein $N_R > 1$;
   (c) determining a synthetic fringe order $N$ using the phase $\phi$ of the first source color and the synthetic phase $\Phi$ which together define a phase couple $(\Phi, \phi)$ that repeats at intervals for which $n_R/N_R = \Lambda/\lambda$;
   (d) determining an optical fringe order $n$ for the source wavelength $\lambda$ using the synthetic fringe order $N$ determined in said step (c); and (e) calculating the object measurement using the optical fringe order n determined in said step (d).

9. The method of claim 8, wherein said step (c) comprises:

(i) obtaining an initial estimate n' of the optical fringe order n in accordance with:

$$n' = \frac{1}{2\pi}\left(\frac{\Phi\Lambda}{\lambda} - \phi\right); \text{ and}$$

(ii) obtaining an estimate N' of the synthetic fringe order N in accordance with:

$$N' = -\frac{n' - Int\{n'\}}{\frac{\Lambda}{\lambda} - Int\left(\frac{\Lambda}{\lambda}\right)}.$$

10. The method of claim 9, wherein said step (d) comprises obtaining a corrected estimate n'' of the optical fringe order n in accordance with:

$$n'' = \frac{1}{2\pi}\left(\frac{\Phi\Lambda}{\lambda} - \phi\right) + \frac{\Lambda}{\lambda} Int\{N'\}.$$

11. The method of claim 10, wherein the object measurement is a distance L and said step (e) comprises calculating the distance L by the steps of:

(1) calculating an intermediate distance value L'' in accordance with:

$$L'' = \left(Int\{n''\} + \frac{\phi}{2\pi}\right)\lambda; \text{ and}$$

(2) calculating the distance L in accordance with:

$$L = L'' - N_R\Lambda \cdot Int\left(\frac{L''}{N_R\Lambda}\right).$$

12. The method of claim 11, wherein said step (b) comprises the steps of:

(i) selecting an unambiguous range that is an integral multiple $N_R$ of the synthetic wavelength $\Lambda$;

(ii) choosing an integer $n_R$ such that a first ratio $n_R/N_R$ is approximately equal to a second ratio $\Lambda/\lambda$; and (iii) adjusting at least one of the first and second color wavelengths $\lambda$, $\lambda_2$ to more closely approximate equality of the first ratio $n_R/N_R$ and the second ratio $\Lambda/\lambda$.

13. The method of claim 12, wherein said step (ii) further comprises confirming that said first ratio $n_R/N_R$ cannot be represented by an equal value ratio x/y having integers y and x that are smaller than said respective integers $N_R$ and $n_R$.

14. The method of claim 8, wherein said step (b) comprises the steps of:

(i) selecting an unambiguous range that is an integral multiple $N_R$ of the synthetic wavelength $\Lambda$;

(ii) choosing an integer $n_R$ such that a first ratio $n_R/N_R$ is approximately equal to a second ratio $\Lambda/\lambda$; and (iii) adjusting at least one of the first and second color wavelengths $\lambda$, $\lambda_2$ to more closely approximate equality of the first ratio $n_R/N_R$ and the second ratio $\Lambda/\lambda$.

15. The method of claim 14, wherein said step (ii) further comprises confirming that said first ratio $n_R/N_R$ cannot be represented by an equal value ratio x/y having integers y and x that are smaller than said respective integers $N_R$ and $n_R$.

* * * * *